(12) United States Patent
Yin et al.

(10) Patent No.: US 9,264,632 B1
(45) Date of Patent: Feb. 16, 2016

(54) METHOD OF ADAPTIVELY REDUCING POWER CONSUMPTION AND AN IMAGE SENSOR THEREOF

(71) Applicant: Himax Imaging Limited, Tainan (TW)

(72) Inventors: Ping-Hung Yin, Tainan (TW); Amit Mittra, Tainan (TW); Jia-Shyang Wang, Tainan (TW); Ray-Chi Chang, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 14/498,204

(22) Filed: Sep. 26, 2014

(51) Int. Cl.
*H04N 5/235* (2006.01)
*H04N 5/353* (2011.01)
*H04N 3/14* (2006.01)

(52) U.S. Cl.
CPC ........... *H04N 5/3532* (2013.01); *H04N 3/1556* (2013.01); *H04N 5/2353* (2013.01)

(58) Field of Classification Search
CPC .. H04N 5/3532; H04N 3/1556; H04N 5/2353
USPC .............. 348/208.12, 221.1, 230.1, 362, 372, 348/434, 435, 477, E5.0372
See application file for complete search history.

(56) References Cited

U.S. PATENT DOCUMENTS

| 8,134,624 | B2* | 3/2012 | Solhusvik | H04N 5/2355 250/208.1 |
| 8,797,433 | B2* | 8/2014 | Kaizu | H04N 5/35554 348/208.4 |
| 9,083,880 | B2* | 7/2015 | Shimamoto | G02B 7/38 |
| 9,094,120 | B2* | 7/2015 | Oshima | H04B 10/116 |
| 2011/0115956 | A1* | 5/2011 | Yanai | G03B 7/00 348/302 |

* cited by examiner

*Primary Examiner* — Hung Lam
(74) *Attorney, Agent, or Firm* — Locke Lord LLP; Tim Tingkang Xia, Esq.

(57) ABSTRACT

A method of adaptively reducing power consumption in an image sensor includes using an electronic rolling shutter to reset pixels of the image sensor row by row. Signal charges are read out from the pixels row by row, followed by obtaining an integration time and a frame height. A power-saving signal is generated when the integration time is substantially greater than the frame height, and at least a circuitry that is not required to operate during an active period of the power-saving signal is turned off.

18 Claims, 3 Drawing Sheets

METHOD OF ADAPTIVELY REDUCING POWER CONSUMPTION AND AN IMAGE SENSOR THEREOF

CROSS-REFERENCE TO RELATED APPLICATIONS

The present application claims priority to and the benefit of Taiwan Patent Application No. TW103127388, filed on Aug. 8, 2014, the entire content of which is incorporated herein by reference.

BACKGROUND OF THE INVENTION

1. Field of the Invention

The present invention generally relates to an image sensor, and more particularly to a method of adaptively reducing power consumption in an image sensor.

2. Description of Related Art

An image sensor, such as a complementary metal-oxide-semiconductor (CMOS) image sensor, is a device that converts an optical image into electronic signals. The image sensor has been widely used in a variety of applications such as cell phones and cameras.

An image sensor is commonly equipped with an electronic rolling shutter, according to which the image sensor is reset row by row, and integrated charges are then read out row by row. A blanking period exists between readouts of two frames, during which a readout circuit is idle. It is thus proposed to turn off the readout circuit to save power. However, in normal light condition, the blanking period is usually too short such that the readout circuit ordinarily cannot recover from the turn-off state to become settled in time, therefore substantially affecting performance of the image sensor.

For the reason that conventional image sensors could not effectively save power, a need has thus arisen to propose a novel image sensor to overcome disadvantages of the conventional image sensors.

SUMMARY OF THE INVENTION

In view of the foregoing, it is an object of the embodiment of the present invention to provide an image sensor and a method of capable of adaptively reducing power consumption in the image sensor such that power saving could be effectively performed without incurring banding issue.

According to one embodiment, an electronic rolling shutter is used to reset pixels of the image sensor row by row, and signal charges are read out from the pixels row by row. An integration time and a frame height are obtained, where the integration time represents a time required to collect signal charge from a photo sensor of the pixel in response to illumination of an incident light. The integration time is compared with the frame height. A power-saving signal is generated when the integration time is substantially greater than the frame height, and at least a circuitry that is not required to operate during an active period of the power-saving signal is turned off.

DETAILED DESCRIPTION OF THE INVENTION

Figure 1:
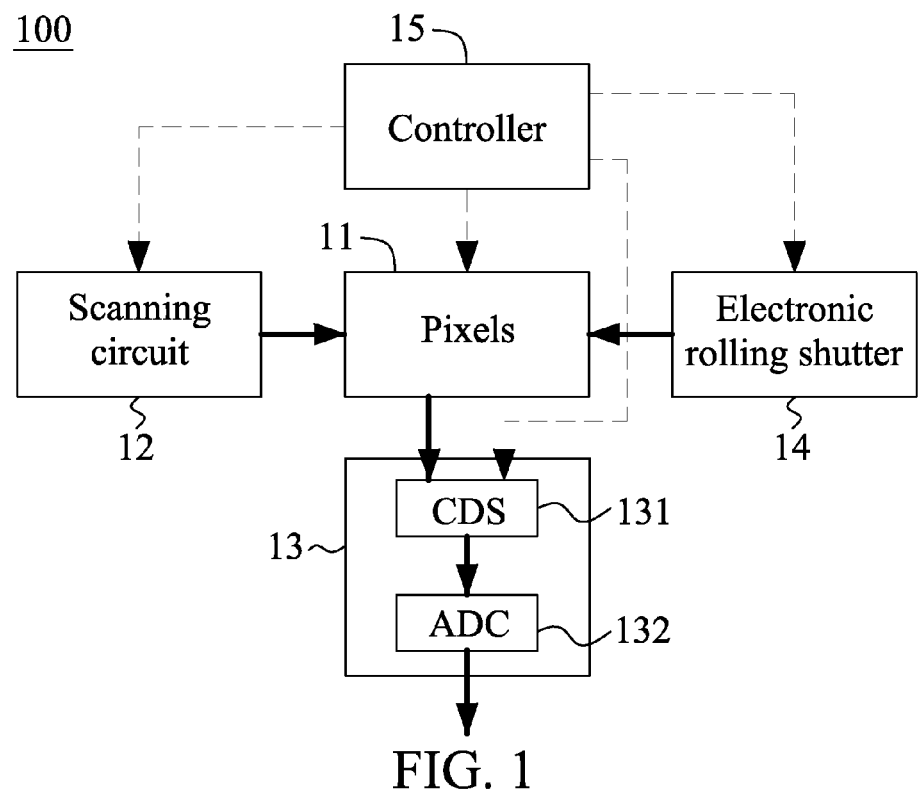
FIG. 1 shows a schematic diagram illustrated of an image sensor according to an exemplary embodiment of the present invention.

FIG. 1 shows a schematic diagram illustrated of an image sensor 100, such as complementary metal-oxide-semiconductor (CMOS) image sensor or CIS, according to an exemplary embodiment of the present invention. The image sensor 100 may primarily include pixels 11 arranged in rows and columns or, alternatively speaking, in a matrix form. Each of the pixels 11 may include a photo sensor (such as a photodiode) and some transistors. Each column or a group of columns of the pixels 11 may further include a column amplifier (not shown) or a sense amplifier.

The image sensor 100 may also include a (vertical) scanning circuit 12 or pixel driver that selects and resets at least a portion of a row of the pixels 11 at a time. Subsequently, signal charges are accumulated or integrated in the selected pixels 11, and are then read out by a readout circuit 13. According to one aspect of the embodiment, an electronic rolling shutter 14 is used such that the signal charges are read out row by row. The readout circuit 13 may include, for example, a correlated double sampling (CDS) circuit 131, followed by an analog-to-digital converter (ADC) 132. The CDS circuit 131 is configured to eliminate noise due to manufacturing variation, and the ADC 132 is used to convert the signal charges from an analog form into a digital form, which facilitates following processing performed, for example, by a digital signal processor (not shown). The elements discussed above may be under control of a controller 15, which performs, among others, timing control to coordinate or synchronize events carried out by the aforementioned elements. The controller 15 may be implemented and manufactured in a single chip or in multiple chips that are either integrated or separated from each other. Moreover, the rolling shutter 14 may be integrated with the controller 15.

Figure 2:
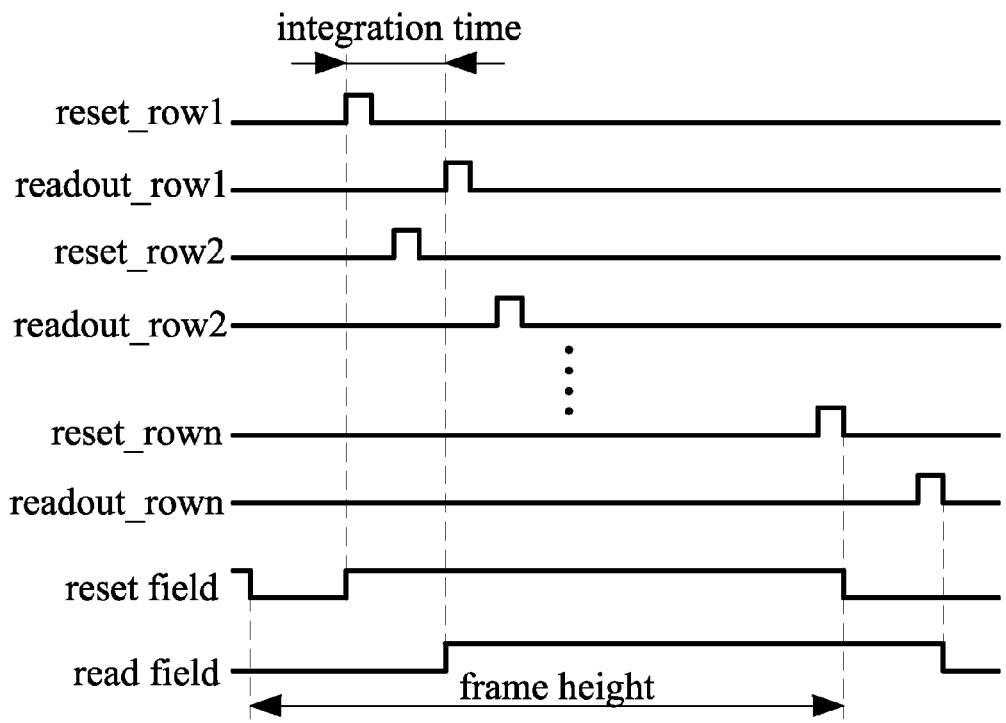
FIG. 2 generally shows a timing diagram illustrating signals pertinent to reset and readout events carried out in the image sensor of FIG. 1.

FIG. 2 generally shows a timing diagram illustrating signals pertinent to reset and readout events carried out in the image sensor 100 of FIG. 1. Specifically, as a reset (event) of a row (say first row) of the pixels 11 is asserted, an integration (event) commences. When the integration finishes, a readout (event) of the same row is asserted. A time period between the beginning of the asserted reset and the beginning of the readout is defined as an integration time. In the specification, the term "integration time," as adopted in the image sensor field, refers to a time required to collect signal charge from the photo sensor of the pixel in response to illumination of an incident light. For a modern image sensor, the integration time may vary from frame to frame according to illumination of the incident light. For example, the less illumination the incident light has, the lengthier the integration time is, and vice versa.

Still referring to FIG. 2, a time period between the reset of the first row and the reset of the last row is defined, in the embodiment, as a reset field. Between two adjacent reset fields is a reset field blanking (period). The sum of the reset field blanking period and the reset field is defined, in the embodiment, as a frame height. A time period between the readout of the first row and the readout of the last row is defined, in the embodiment, as a read field. Between two adjacent read fields is a read field blanking (period). It is noted that the integration time and the frame height mentioned above may be obtained from the controller 15.

Figure 3:
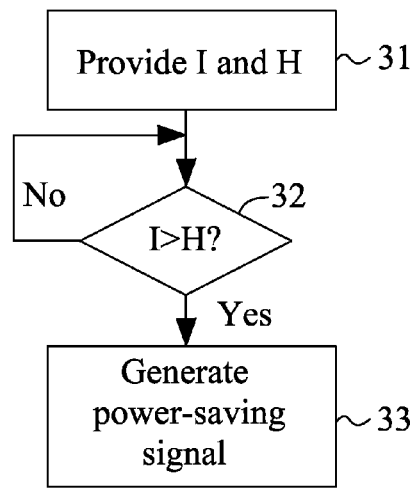
FIG. 3 shows a flow diagram illustrating a method of adaptively reducing power consumption in the image sensor of FIG. 1 according to one embodiment of the present invention.

FIG. 3 shows a flow diagram illustrating a method of adaptively reducing power consumption in the image sensor 100 of FIG. 1 according to one embodiment of the present invention. In step 31, an integration time I and a frame height H of the image sensor 100 are provided, for example, by the controller 15 (FIG. 1). Subsequently, in step 32, the integration time I is compared with the frame height H (for example, by the controller 15). If the integration time I is not substantially greater than the frame height H, no act concerning power saving is carried out. It is appreciated that, in the embodiment, the expression "the integration time I is substantially greater than the frame height H" or "I>H" in step 32 means that the value I is greater than the value H by a margin of a predefined value. For example, the margin may be set to a period required to reset one row of the pixels 11.

Figure 4:
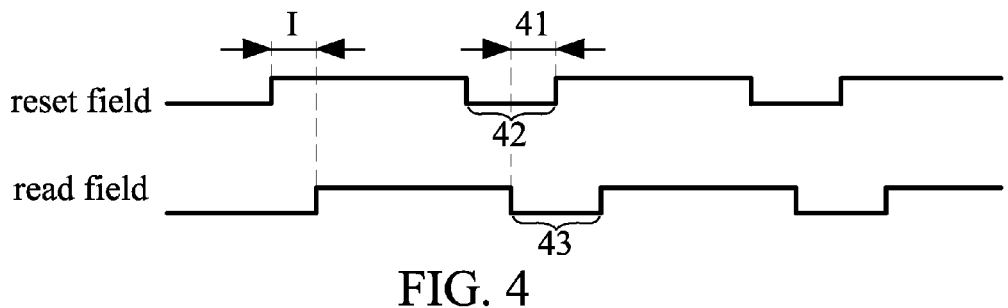
FIG. 4 shows an exemplary timing diagram illustrating reset field and read field events when it is determined that the integration time is not substantially greater than the frame height.

FIG. 4 shows an exemplary timing diagram illustrating reset field and read field events when it is determined that the integration time I is not substantially greater than the frame height H (not shown in FIG. 4). It is observed that there is an overlapped period 41 between a reset field blanking 42 and a read field blanking 43, during which both the reset field and read field are de-asserted. The overlapped period 41 is generally not long enough to perform power saving. If power saving is performed in the overlapped period 41, banding issue may probably arise.

On the other hand, if it is determined in step 32, for example, by the controller 15, that the integration time I is substantially greater than the frame height H, a power-saving signal may accordingly be generated in step 33, for example, by the controller 15. During the active (or asserted) period of the power-saving signal, at least a portion of the readout circuit 13, such as the CDS circuit 131 and/or the ADC 132, may be turned off to reduce power consumption. For example, a power of a pertinent circuit may be completely cut down, or may be partially cut down (e.g., reduced to 10% of an operating power).

Figure 5:
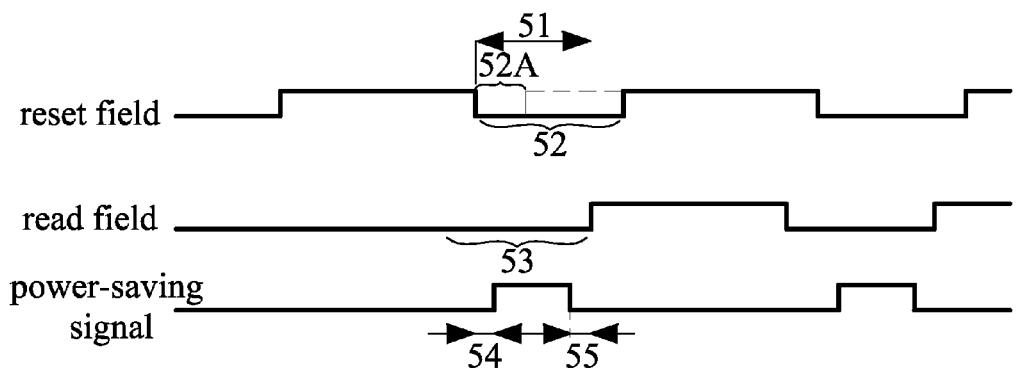
FIG. 5 shows an exemplary timing diagram illustrating reset field and read field events when it is determined that the integration time is substantially greater than the frame height.

FIG. 5 shows an exemplary timing diagram illustrating reset field and read field events when it is determined that the integration time I is substantially greater than the frame height H (not shown in FIG. 4). It is observed that there is an overlapped period 51 between a reset field blanking 52 and a read field blanking 53, during which both the reset field and read field are de-asserted. The overlapped period 51 is generally long enough to perform power saving. Generally speaking, any circuitry that is not required to operate in the overlapped period 51 may be turned off to reduce power consumption, for example, by reducing clock rate at which the pertinent circuit is running, by reducing a bias current to the pertinent circuit, or by reducing supply voltage to the pertinent circuit.

The reason that the overlapped period 51 (FIG. 5) is generally longer than the overlapped period 41 (FIG. 4) may come from the following scenario. As discussed above, the integration time may vary from frame to frame according to illumination of the incident light. In a normal light condition, the integration is short enough to collect signal charges from the photo sensor of the pixel 11. Therefore, a reset field blanking 52A as denoted by a dotted line in FIG. 5 is also short. In low-light mode, however, the integration becomes longer in order to allocate more time to collect signal charges from the photo sensor of the pixel 11. Therefore, a rest field blanking 52 as denoted by a solid line in FIG. 5 is extended to be longer accordingly. As a result, the overlapped period 51 generally long enough to perform power saving without incurring banding issue.

In practice, referring to FIG. 5, a latency (or delay) of predetermined length, called lead time 54, between the beginning of the overlapped period 51 and the beginning of the power-saving signal may be required to ensure that the reset field event has been properly ended such that the power saving performed would not affect normal operation of the image sensor 100.

Moreover, still referring to FIG. 5, a latency of predetermined length, called lag time 55, between the end of the power-saving signal and the end of the overlapped period 51 may be required to ensure that there is enough time for the pertinent circuit to recover from a turn-off state back to a normal operating state in time.

Figure 6:
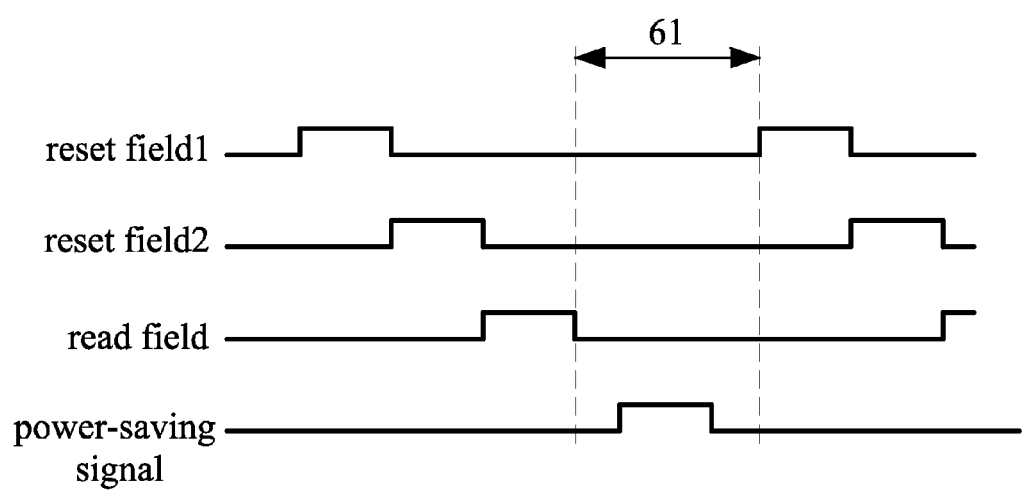
FIG. 6 shows an exemplary timing diagram illustrating reset fields and read field events according to another embodiment of the present invention, when it is determined that the integration time is substantially greater than the frame height.

The embodiment discussed above may be adapted to an image sensor operated in a manner other than that shown in FIG. 2. For example, an Enhanced Dynamic Range (EDR) image sensor may have a timing diagram exemplifying in FIG. 6. When the integration time I is substantially greater than the frame height H, a power-saving signal may accordingly be generated in an overlapped period 61 overlapped among blanking periods of a reset field 1, a reset field 2 and a read field event. During the active (or asserted) period of the power-saving signal, at least a portion of the readout circuit 13, such as the CDS circuit 131 and/or the ADC 132, may be turned off to reduce power consumption.

Although specific embodiments have been illustrated and described, it will be appreciated by those skilled in the art that various modifications may be made without departing from the scope of the present invention, which is intended to be limited solely by the appended claims.

What is claimed is:

1. A method of adaptively reducing power consumption in an image sensor, the method comprising:
   using an electronic rolling shutter to reset pixels of the image sensor row by row;
   reading out signal charges from the pixels row by row;
   obtaining an integration time and a time period of a frame height, the integration time representing a time required to collect signal charge from a photo sensor of the pixel in response to illumination of an incident light;
   comparing the integration time with the time period of the frame height;
   generating a power-saving signal when the integration time is substantially greater than the time period of the frame height; and
   turning off at least a circuitry that is not required to operate during an active period of the power-saving signal.

2. The method of claim 1, wherein the integration time is a time period between a beginning of resetting a given row and a beginning of reading out the given row.

3. The method of claim 1, wherein the time period of the frame height is a sum of a reset field blanking and a reset field, wherein the reset field is a time period between a reset of a first row and a reset of the last row of the pixels, and the reset field blanking is a time period between two adjacent reset fields.

4. The method of claim 3, wherein the power-saving signal is generated in an overlapped period between the reset field blanking and a read field blanking, wherein the read field blanking is a time period between two adjacent read fields, the read field being a time period between readout of the first row and readout of the last row of the pixels.

5. The method of claim 1, no act concerning power saving is carried out, when the integration time is not substantially greater than the frame height.

6. The method of claim 1, wherein the circuitry turned off during the active period of the power-saving signal comprises a readout circuit.

7. The method of claim 6, wherein the readout circuit comprises a correlated double sampling (CDS) circuit and/or an analog-to-digital converter (ADC).

8. The method of claim 1, further comprising a lead time between a beginning of the overlapped period and a beginning of the power-saving signal.

9. The method of claim 1, further comprising a lag time between an end of the power-saving signal and an end of the overlapped period.

10. An image sensor capable of adaptively reducing power consumption, the image sensor comprising:
   an electronic rolling shutter;
   a plurality of pixels arranged in rows and columns;
   a scanning circuit configured to reset the pixels row by row by using an electronic rolling shutter;
   a readout circuit configured to read out signal charges from the pixels row by row; and
   a controller configured to obtain an integration time and a time period of a frame height,
   the integration time representing a time required to collect signal charge from a photo sensor of the pixel in response to illumination of an incident light;
   wherein the integration time is compared with the time period of the frame height, and a power-saving signal is generated when the integration time is substantially greater than the time period of the frame height, such that at least a circuitry that is not required to operate during an active period of the power-saving signal is turned off.

11. The image sensor of claim 10, wherein the integration time is a time period between a beginning of resetting a given row and a beginning of reading out the given row.

12. The image sensor of claim 10, wherein the time period of the frame height is a sum of a reset field blanking and a reset field, wherein the reset field is a time period between a reset of a first row and a reset of the last row of the pixels, and the reset field blanking is a time period between two adjacent reset fields.

13. The image sensor of claim 12, wherein the power-saving signal is generated in an overlapped period between the reset field blanking and a read field blanking, wherein the read field blanking is a time period between two adjacent read fields, the read field being a time period between readout of the first row and readout of the last row of the pixels.

14. The image sensor of claim 10, no act concerning power saving is carried out, when the integration time is not substantially greater than the frame height.

15. The image sensor of claim 10, wherein the circuitry turned off during the active period of the power-saving signal comprises the readout circuit.

16. The image sensor of claim 15, wherein the readout circuit comprises a correlated double sampling (CDS) circuit and/or an analog-to-digital converter (ADC).

17. The image sensor of claim 10, further comprising allocating a lead time between a beginning of the overlapped period and a beginning of the power-saving signal.

18. The image sensor of claim 10, further comprising allocating a lag time between an end of the power-saving signal and an end of the overlapped period.

* * * * *